United States Patent Office 3,401,194
Patented Sept. 10, 1968

3,401,194
PROCESS FOR THE RESOLUTION OF STEREO-
ISOMERS FROM RACEMIC 1-HYDROXY-2-
AMINO BUTANE
Giorgio Zoja, Milan, Italy, assignor to Laboratorio Chimico Farmaceutico Giorgio Zoja S.p.A., Milan, Italy, a corporation of Italy
No Drawing. Filed Aug. 4, 1964, Ser. No. 387,504
Claims priority, application Italy, Aug. 10, 1963,
16,917/63
12 Claims. (Cl. 260—501.1)

ABSTRACT OF THE DISCLOSURE

Recovering (+) 1-hydroxy-2-amino butane (+) hydrogen tartrate from mixtures thereof with (−) 1-hydroxy-2-amino butane (+) hydrogen tartrate substantially in the pure state in yields of at least about 80% by first removing at least 70% by weight of the (−) 1-hydroxy-2-amino butane (+) hydrogen tartrate by fractional crystallization and then crystallizing the (+) 1-hydroxy-2-amino butane (+) hydrogen tartrate and purifying it by treatment with methanol.

---

The present invention relates to a process for the resolution of racemic 1-hydroxy-2-amino butane (which will be hereinafter called for the sake of simplicity HAB) in its optical antipodes.

The process mainly comprises the following operations:

(a) salification of the racemic HAB by equimolar amounts of (+) tartaric acid resulting in the formation of two acid tartrate diastereomers: (+) 1-hydroxy-2-amino butane (+) hydrogen tartrate (hereinafter called for the sake of simplicity (+)HAB(+)T and (−) 1-hydroxy-2-amino butane (+) hydrogen tartrate monohydrate (hereinafter indicated as (−)HAB(+)T);

(b) separation by fractional distillation of the two diastereomers;

(c) recovery of the optically active bases from said diastereomers.

Both (−)HAB and (+)HAB are very useful, particularly if they may be obtained at a low cost, due to the fact, for instance, that they allow the resolution of racemic acids, such as the amino acids and particularly the glutamic acids, the use of which is well known in the alimentary, zootechnic and pharmaceutical fields; moreover they are very useful for the synthesis of valuable products such as dextrorotatory N-N'-bis-(1-hydroxymethyl-propyl)-diamino-ethane (see J. Am. Chem. Soc., 83, 2212 (1961)), and the 4-ethyl-2-thiazoline (see C. r. 253, 2704 (1961)).

It is known (see J. Am. Chem. Soc. 76, 2801 (1954)) that from the racemic HAB it is possible to obtain the (−)HAB through a process comprising the formation of the hydrogen tartrate, the separation of the (−)HAB(+)T substantially in the pure state, and then the treatment of the product with lime, in order to obtain the (−)HAB.

According to this process it was not possible to obtain the (+)HAB, since at the time a method was not known for obtaining sufficiently pure (+)HAB(+)T. Therefore, yields in optically active product calculated on the starting racemate were very low.

I have now surprisingly found that, while in absolute ethyl alcohol the two diastereomers mentioned above have practically the same solubility and in 95% ethyl alcohol (by weight) the (+)HAB(+)T is more soluble, in methanol the (+)HAB(+)T is remarkably less soluble than its diastereomer.

This surprising discovery has led to the realization of the process of the present invention according to which the two diastereomers (+)HAB(+)T and (−)HAB(+)T and as a consequence the (+)HAB and the (−)HAB, are separated practically in the pure state.

Therefore the main object of the present invention consists in separating the (−)HAB and the (+)HAB substantially in the pure state from the racemic mixture.

A further object is that of carrying out said separation with high yields.

Further objects beside those mentioned will clearly appear from the description of the invention set forth hereinafter.

One method of carrying out the invention may be summarized as follows (see Example 1):

(1) an equimolar amount of racemic HAB is slowly added, at room temperature, to an aqueous solution of tartaric acid with vigorous stirring. The amount of water is such that its ratio by weight with respect to that of the sum of the reagents is between 0.95 and 1.20;

(2) an amount of (−)HAB(+)T, higher than 70% by weight of the total amount present, is separated from the solution by cooling and, if necessary, concentration of the solution, and is purified by washing or by recrystallization with ethanol in order to obtain a product having the following characteristics: M.P. 102–103° C., $[\alpha]_D^{31} = +10.4° \pm 0.1°$ ($H_2O$ c. 8);

(3) an amount of salt between 80 and 95% of the total amount present in the mother liquor of item 2), is separated from said mother liquor by subsequent concentration followed by cooling, said salt constituting impure (+)HAB(+)T;

(4) the various fractions of salt obtained under item (3) are purified by finely grinding them in the presence of methanol and preferably washing them, always with methanol, to obtain a substantially pure product, (+)HAB(+)T, namely a product having a $[\alpha]_D^{31}$ higher than +24.0° ($H_2O$ c. 8);

(5) the (−)HAB(+)T of the preceding item (2) is dissolved in water, preferably in ratio of 1 part by weight of salt in 10 parts of water and, preferably, the solution is passed through a ion-exchange resin (for example a resin containing quaternary organic amine groups of the Kastel A–300 or Amberlite IRA 400 types) in order to fix the tartaric acid, thus releasing the (−)HAB which is thereafter obtained substantially in the pure state by fractional distillation of the aqueous solution obtained by the ion-exchange procedure. Instead of using an ion-exchange resin, one can treat the solution with lime water, precipitating the calcium tartrate according to the known method, and then distill;

the (+)HAB(+)T is separated by operating as described under item (5), obtaining the substantially pure (+)HAB.

A further method of carrying out the invention, considerably improved with respect to that already described, by simplifying the process and also obtaining higher yields of (−)HAB(+)T and (+)HAB(+)T, that is around 100% and 80% respectively, is hereafter described.

Said improved method, which will appear evident from a comparison between Examples 1 and 2, comprises:

(a) carrying out the reaction between tartaric acid and the racemic hydroxy-amino butane with a mixture of water and ice;

(b) the crystallization of the salts from the mother liquor is carried out, when suitable, under stirring;

(c) the washing of the crude $(+)\text{HAB}(+)\text{T}$ crystalline fractions is performed with methanol, instead of ethanol as described hereinabove in item (2) and the purification of said fractions is carried out in the presence of methanol under stirring, instead of grinding as described hereinabove in item (4).

From the above description, it follows that, by the process of the present invention it is possible to resolve the starting racemic product with very high yields.

The following examples are furnished to better illustrate the present invention without however limiting it in any respect.

Example 1

A solution of 25,200 g. of (+) tartaric acid in 40,000 cc. of water is prepared; thereafter 15,000 g. of racemic HAB are added to it under vigorous stirring, maintaining the temperature below 40° C.

The solution is left overnight in refrigerator at a temperature not higher than 10° C.

The crystalline mass is centrifuged and washed on the centrifuge with 5 liters 95% ethanol; a fraction I, constituting by 11,010 g. of $(-)\text{HAB}(+)\text{T}$, melting point 102–103° C. and $[\alpha]_D^{31}=+10.4°$ ($H_2O$ c. 8), is obtained.

The residual mother liquors added with the washing ethanol are left in a refrigerator as previously described. A crop of crystal is separated by centrifugation and washing with 2 liters 95% ethyl alcohol. In such a way a fraction II is obtained constituting 2,240 g. of salt.

The residual mother liquor, together with the washing ethanol, is evaporated to eliminate 20 liters of solvent and then is left overnight in a refrigerator.

A fraction III constituting 1,650 g. of salt is separated by centrifugation and washing with 2.5 liters of ethanol.

The fractions II and III are crystallized with 50% ethanol, yielding 3,350, of $(-)\text{HAB}(+)\text{T}$.

By so operating, 14,360 g. of substantially pure $$(-)\text{HAB}(+)\text{T}$$

M.P. 102–103° C., $[\alpha]_D^{31}=+10.4°\pm0.1°$ ($H_2O$ c. 8), are obtained

The residual mother liquor of the preceding separation is evaporated to eliminate 20 liters of solvent and is left overnight in a refrigerator.

11,815 g. of a fraction IV of $(+)\text{HAB}(+)\text{T}$ containing a small quantity of $(-)\text{HAB}(+)\text{T}$, are then separated by centrifugation and washed with 4.5 liters of 95% ethanol.

The mother liquor of the preceding phase is left over two days in a refrigerator and is centrifuged and washed with 4 liters of 95% ethanol yielding a fraction V of 6,600 g. of impure $(+)\text{HAB}(+)\text{T}$.

Practically all the solvent is removed from the mother liquor of the preceding phase and a fraction VI is collected, which, after centrifugation and washing with 4.2 liters of 95% ethanol, weighs 4,230 g. and is constituted by impure $(+)\text{HAB}(+)\text{T}$.

The syrupy liquid obtained from the centrifugation, added to the washing ethanol, is left over three days in a refrigerator and, after washing with 0.5 liter of ethanol, a further fraction VII constituting 250 g. of salt is collected.

The fraction IV is repeatedly ground in a ball mill with methanol, employing on the whole 18,000 cm.³ of said alcohol.

The solvent is removed after each grinding and the solid is washed with a small amount of methanol. In such a way, 8,045 g. of $(+)\text{HAB}(+)\text{T}$, M.P. 141–142° C., $[\alpha]_D^{31}=24.2°\pm0.1°$ ($H_2O$ c. 8) are obtained.

The fraction V is ground repeatedly with 9,500 cm.³ on the whole of methanol by operating as above: thus 4,260 g. $(+)\text{HAB}(+)\text{T}$ are obtained.

The fraction VI is treated as the preceding one with 4,000 cm.³ on the whole of methanol. 2,895 g. of $$(+)\text{HAB}(+)\text{T}$$

are thus obtained.

The fraction VII, ground as above with 400 cm.³ of methanol, yields 160 g. of $(+)\text{HAB}(+)\text{T}$.

The total yield is therefore 15,360 g. of $$(+)\text{HAB}(+)\text{T}$$

M.P. 141–142°, $[\alpha]_D^{31}=+24.2°\pm0.1°$ ($H_2O$ c. 8).

The methanol is distilled from the mother liquor to obtain a syrupy residue which crystallizes by cooling. The solid consists of $(-)\text{HAB}(+)\text{T}$ containing a small amount of the disastereomer.

This solid is recrystallized from 50% ethyl alcohol to obtain the pure monohydrate $(-)\text{HAB}(+)\text{T}$.

The aqueous ethyl alcohol mother liquor is added to the mother liquors obtained from the crystallization of fractions II and III and the solvent is completely removed.

The residual salt is treated with methanol as described above, yielding a further amount of $(+)\text{HAB}(+)\text{T}$.

A solution constituting 2,000 cc. of water of 207 g. of $(-)\text{HAB}(+)\text{T}$ is prepared and then percolated through a column containing 1 liter of Kastel A–300 resin. The resin is then washed with water, collecting the aqueous eluate until the pH is reduced to about 8.

The collected liquids are treated in a rotating evaporator under vacuum, in order to eliminate as much water as possible, taking care that the temperature of the liquid does not exceed 50° C.

The residue is distilled under vacuum and the fraction boiling at 80–82° C. at 15 torr is collected.

62 g. of $(-)\text{HAB}$, $[\alpha]_D^{31}=-9.37°\pm0.01°$, are obtained.

The $(+)\text{HAB}(+)\text{T}$ is treated analogously and 67 g. of $(+)\text{HAB}$, $[\alpha]_D^{31}=+9.39°\pm0.01°$, are obtained.

Example 2

36 kg. of racemic HAB and 40 kg. of ice in small pieces are gradually added, under stirring, to a solution of 60.4 kg. of tartaric acid in 50 liters of water.

The solution is cooled, while stirring, at 5–10° C. and after some hours the crystalline mass formed is centrifuged and washed with 10 liters of 95% ethyl alcohol. Thus a fraction I is obtained which constitutes 31.2 kg. of $(-)\text{HAB}(+)\text{T}$ almost in the pure state, M.P. 100–103° C.

The combined mother liquor and ethyl alcohol washings are left standing over two days at 5–10° C. In this way a crystalline crop is formed which is centrifuged and washed with 1.8 liters of 95% alcohol; a fraction II is obtained which constitutes 3.6 kg. of $(-)\text{HAB}(+)\text{T}$ almost in the pure state, M.P. 99–102° C.

About 25 liters of solvent are removed by distillation of the mother liquor, combined with the ethyl alcohol washings, heated at about 80° C. under reduced pressure. The concentrated solution is cooled rather quickly to 5–10° C. and it is maintained at this temperature overnight under gentle stirring.

Stirring has the function of not allowing crystals to grow so that said crystals can be washed more easily.

A fraction III is thus separated by centrifugation and washing with 7.5 liters of methanol.

The fraction III is transferred into a vessel, 10 liters of methanol are added while vigorously stirring for ½ hour, and then the crystals are centrifuged. Washing with methanol is repeated until the melting point of the crystals become higher than 139° C. 3–5 washings are generally needed; the methyl alcohol containing liquid collected from the last washing is kept aside. In this way 6.0 kg. of $(+)\text{HAB}(+)\text{T}$, M.P. 140–142° C., are obtained.

To the aqueous mother liquor, the washing methanol from the first centrifugation of the fraction III is added. About 35 liters of solvent are removed. After cooling, the crystals are centrifuged and washed with 6 liters of methyl alcohol coming from the last treatment of the previous fraction. The crystals are then washed in the vessel with methanol.

12.0 kg. of (+)HAB(+)T, M.P. 140–141° C., are obtained (fraction IV).

The liquid from the last washing is kept aside.

By further concentrations (removing each time about 15–20 liters of solvent by distillation) and subsequent washings with methanol as above described, the following fractions are obtained:

| | Kg., M.P. 140–141° C. |
|---|---|
| Fraction V | 11.0 |
| Fraction VI | 6.8 |
| Fraction VII | 2.8 |

Methanol is removed by distillation of all the combined methyl alcohol containing liquids to obtain 15–18 liters of solution. 14.0 kg. of (−)HAB(+)T almost pure, M.P. 100–102° C., are obtained from this solution by cooling under stirring, centrifugation and washing with ethyl alcohol.

These 14 kg. of (−)HAB(+)T together with fractions I and II are crystallized from 95% ethyl alcohol, yielding (−)HAB(+)T, M.P. 102–103° C.

To obtain (−)HAB and (+)HAB from (−)HAB(+)T and (+)HAB(+)T respectively, the procedure described in the preceding example is employed.

Many variations of the procedures illustrated in the examples, all known to those skilled in the art, may be made without departing from the spirit of the present invention.

For example, total counter-current washing of the two diastereomers can be employed to reduce the quantity of alcohol needed.

As already mentioned in the introductory part of this specification, the washing of the various fractions of the two disastereomers can be regulated in order to obtain products having selected characteristics of purity which can be determined on the base of their rotating powers or melting points.

Likewise within the scope of the present invention are all those processes which, instead of treating the racemic HAB, may treat mixtures containing the optical antipodes in any ratio, or other possible processes starting from solutions of (+)HAB(+)T and (−)HAB(+)T not in equimolar ratio, provided that the separation and the purification of the (+)HAB(+)T are accomplished by using methanol.

Having thus described my invention, what I desire to secure and claim by Letters Patent is:

1. In a process for separating (+)1-hydroxy-2-amino butane and (−)1-hydroxy-2-amino butane, substantially in the pure state, from mixtures thereof by reacting said mixtures in aqueous solution with (+) tartaric acid and separating by fractional crystallization the two diastereomers thus formed, (+)1-hydroxy-2-amino butane (+)hydrogen tartrate and (−)1-hydroxy-2-amino butane (+)hydrogen tartrate, the improvement which comprises recovering at least 80% of the initial (+)1-hydroxy-2-amino butane (+)hydrogen tartrate substantially in the pure state by treating with methanol the crystalline fraction which is obtained from said aqueous solution after removal from said aqueous solution of at least 70% by weight of the initial (−)1-hydroxy-2-amino butane (+)hydrogen tartrate by fractional crystallization.

2. The process of claim 1 wherein the treated mixtures of (+) and (−)1-hydroxy-2-amino butane are racemic mixtures.

3. The process of claim 1 wherein the (+) tartaric acid and the 1-hydroxy-2-amino butane are reacted in equimolar ratios.

4. The process of claim 1 wherein the weight ratio of the water to the reagents, tartaric acid and 1-hydroxy-2-amino butane, is between about 0.95 and 1.20.

5. The process of claim 1 wherein the water is partially in the form of ice.

6. The process of claim 1 wherein at least one of said saline fractions is crystallized from the mother liquor with stirring.

7. The process of claim 1 wherein said methanol treatment comprises washing of the crude (+)1-hydroxy-2-amino butane (+)hydrogen tartrate solid fractions with methanol.

8. The process of claim 1 wherein said treatment with methanol is carried out by grinding in the presence of methanol followed by washing therewith.

9. The process of claim 1 wherein said methanol treatment is with between about 0.8 liter and 1.7 liters of methanol per kg. of impure salt.

10. The process of claim 1 further comprising, after separation of the two disastereomers substantially in the pure state, separately dissolving said diastereomers in water and separately percolating the resulting solutions through masses of ion-exchange resins.

11. The process of claim 1 wherein the removal of at least 70% by weight, with respect to the total amount thereof, of the diastereomer (−)1-hydroxy-2-amino butane (+)hydrogen tartrate from the aqueous solution is accomplished by cooling said solution at a temperature not higher than 10° C. and by subsequent partial concentration.

12. The process of claim 11 wherein said solution is cooled to about 70° C.

References Cited

Roggero et al., Academie des Sciences Comptes, rendus T. 253 December 1961 p. 2704.

Stoll et al., Helvetica Chimica Acta, v. 26, 1943, pp. 922–928.

Radke et al., J.A.C.S. vol. 76, pp. 2801–2802.

CHARLES B. PARKER, *Primary Examiner.*

D. R. PHILLIPS, *Assistant Examiner.*